F. H. WEBSTER.
CONCRETE PAVEMENT AND METHOD OF MAKING SAME.
APPLICATION FILED JUNE 20, 1912.
1,064,408.
Patented June 10, 1913.
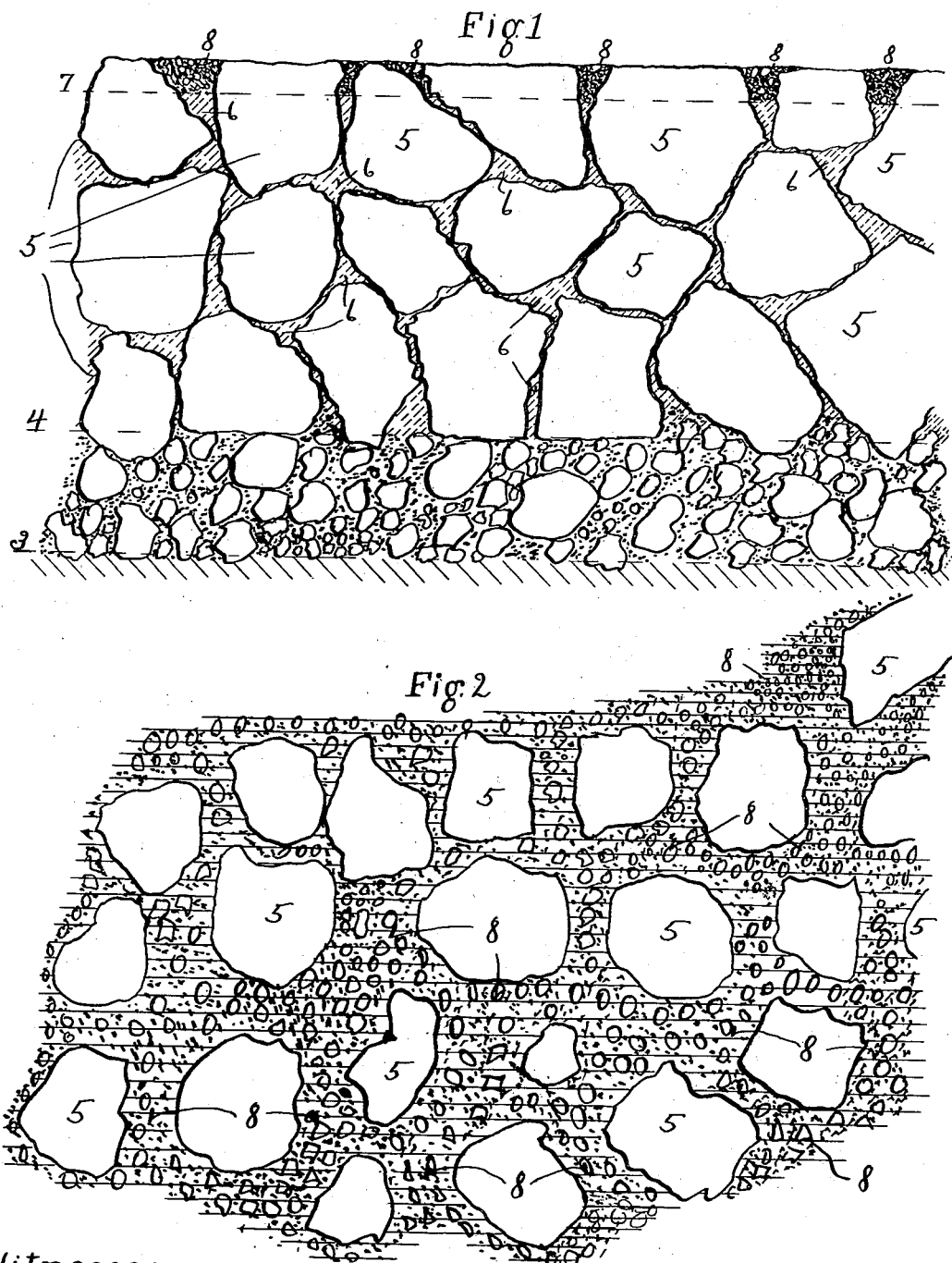
Witnesses
Inventor
Fredrick H Webster
By J. A. Rosen
Atty

UNITED STATES PATENT OFFICE.

FREDRICK H. WEBSTER, OF KANSAS CITY, KANSAS.

CONCRETE PAVEMENT AND METHOD OF MAKING SAME.

1,064,408.  Specification of Letters Patent.  Patented June 10, 1913.

Application filed June 20, 1912. Serial No. 704,736.

*To all whom it may concern:*

Be it known that I, FREDRICK H. WEBSTER, a citizen of the United States, residing at Kansas City, in the county of Wyandotte and State of Kansas, have invented certain new and useful Improvements in Concrete Pavements and Methods of Making Same, of which the following is a specification.

My invention relates to concrete pavement in which the main body comprises Portland cement concrete.

The object of my invention is to improve generally upon pavement of this kind and to produce in a simple and economical way a pavement of this kind that is durable and that has and will maintain a proper wearing surface.

More fully to explain my invention, I will first explain in a general way the defects in pavement of this kind which my invention seeks to remedy.

In the process of setting and hardening, the pavement becomes cracked unless expansion cracks are made at frequent intervals in process of construction. These cracks are objectionable for obvious reasons whether made during construction or formed by process of nature.

It has been impossible to secure a suitable wearing surface without the addition of a superposed layer. In considering the wearing surface, two principal qualities are to be considered: first, the quality as to being even, uneven, smooth, slippery, etc.; and second, the quality of resistance to wear. As to the first-named quality, it may be deemed conceded that a smooth, even, and non-slippery surface is desired. As to the second-named quality in its relation to Portland cement concrete pavement in particular two factors are to be considered, namely, the resistance to wear of the stone, which is a certain quantity determinable at the time of constructing the pavement and remaining the same; and the resistance to wear of the cement mortar or grout. This latter is zero at the moment the cement is placed, increases rapidly until it is "set," and then continues to increase with age until it is as great as that of the clinker from which the cement was made—estimated anywhere up to twenty years, but not less than several years. In actual practice, however, it is impossible to maintain a concrete pavement closed to traffic until such time as it has acquired anywhere near its maximum resistance to wear, it being generally opened to traffic within from a few days to a few weeks after construction; thus subjecting it at the very outset to hard usage having the tendency to break up its upper surface and in time wearing out the pavement before the cement has had time to acquire anywhere near its maximum efficiency.

Now, it is the object of my invention to prevent or at least to minimize the cracking of the concrete body, and to construct the pavement in such a way that whatever cracking does occur will not be apparent or affect the integrity of the pavement; to provide a special kind of sub-base for the concrete body; to treat the sub-base and the crushed rock in the body of the concrete so as to reduce the amount of cement mortar or grouting that is necessary to fill the voids in the rock; to fill the voids in the rock nearly but not quite up to the top of the concrete body with cement mortar or grout and then fill the interstices between the rock above the cement mortar or grout with a bituminous concrete filler up to the surface of the rock, so that the surface of the completed pavement will be comprised principally of the surfaces of the upper stones of the concrete, and, supplementary, of the surface of the bituminous concrete which forms a network extending in all directions between the upper surfaces of those stones, thus forming a wearing surface which is even, smooth, and non-slippery.

It is a further object of my invention to use, in connection with a concrete pavement whose upper surface is rolled down smooth and even with shallow interstices between the upper surfaces of the upper stones, a bituminous concrete filler that is just level with the upper surface of those stones.

Further objects will appear hereinafter.

I attain these objects by my herein-described improvements which comprise: first, a sub-base placed between the ground and the concrete body and comprising crushed rock of small size with the dust included; second, by laying the sub-base without rolling, then laying the dry crushed rock for the concrete body and rolling same hard, then wetting the two bodies, the sub-base being wet to the point of saturation and then while they are so wet and saturated pouring in the thin cement mortar or grout to fill the voids in the concrete body; and third, by constructing the concrete body as hereinbefore set forth with interstices between the upper surfaces of the upper stones and filling such interstices with bituminous concrete up to the level of the top of such stones; and fourth, by the means and methods hereinafter pointed out.

In the drawings accompanying and forming part of this specification, Figure 1 is a vertical section of a completed pavement made in accordance with the principles of my invention. Fig. 2 is a plan of the upper surface.

Similar reference characters indicate similar parts in body views.

3 is the upper surface of the ground foundation prepared in any suitable manner. Upon this natural foundation is laid the sub-base, the approximate upper surface of which is indicated by the line 4, and which is composed of small crushed rock with the dust included, say from one inch down. This layer is preferably not rolled or tamped, but merely leveled off smooth. On this sub-base the main concrete body is laid.

Preferably the main concrete body is constructed as follows: I use suitable crushed rock of approximately equal sizes, say from one and one-half to two and one-half inches, laid upon the sub-base and then rolled heavily to compact them thoroughly together. This rolling also compacts the stones and dust in the sub-base, and causes an intermeshing of the lower ends of the concrete stones with the material in the sub-base, the projections of the larger stones extending down into the sub-base, and the material of the sub-base being forced up in some small degree between the stones of the concrete course. The heavy rolling also brings down to a level the upper surfaces of all the upper stones, making a substantially smooth and level upper surface, except for the network of interstices between the high parts of those upper stones. The body is now ready for the cement mortar or grouting. I prefer to use a mixture of rich Portland cement and sand, proportioned as to sand voids, generally speaking, 1 to 2. But, before applying this mixture, I thoroughly wet the stones of the concrete body, and the sub-base, and then, while they are wet pour the cement mortar or grout into the interstices. The object in the preliminary wetting, is to soak the sub-base with water to the point of saturation, so that the flow of the cement mixture will be stopped at the sub-base and not pass into or through the sub-base or into the ground. I thus effect a considerable saving in cement which would otherwise be lost by flowing with its vehicle, water, on through the concrete stones and into the ground where it would serve no beneficial purpose and be wasted. From which, it is obvious that sufficient dust should be in the sub-base to absorb and for a length of time retain the water which is permitted to flow thereinto, so as to prevent the cement mixture from flowing thereinto or therethrough. A further function of this sub-base is to afford a yielding mat or foundation for the concrete body. In case of shrinkage, certain parts of the concrete body must move. In case the projecting ends were forced into the hard upper crust of the rolled ground, they would tend to hold the pavement rigid with the result that the natural process of shrinking would cause cracks at frequent intervals through the pavement; but my yielding sub-base, permits the slight horizontal movement mentioned, so that the natural process will not be exaggerated.

In the drawing 5, 5 indicate the crushed rock of the concrete body, and 6, 6 indicate the cement mortar or grouting.

The mortar is not filled in up to the top of the stones, but only up to within a short distance thereof, as indicated by the line 7, leaving shallow interstices between the upper surfaces of the upper stones, of say from one-half to three-quarters inch depth, these being left either when pouring the mixture, or by lightly sweeping with a broom before the cement has set. And as the interstices are quite shallow compared to the size of the stones, their existence does not affect the integrity of the concrete body materially, especially in view of the filler next described. After the concrete stratum has set and become well hardened, I fill these interstices with bituminous concrete 8 up to a level with the upper surfaces of the upper stones of the concrete body, and roll the same so as to bring the final surface of the completed pavement down smooth and the same as the plane of the upper surfaces of the upper stones of the concrete stratum. I prefer to apply the bituminous concrete filler as follows: By previous test as to quantity of filler required, I pour in about ten per cent. pure bitumen, hot, on which I place hot small stones, say one-quarter inch down and preferably with dust blown out, and then roll, the small stone working into the bitumen, and the two elements forming a bituminous concrete body of which about ninety per cent. is stone.

As heretofore stated, I prefer to let the concrete crack if so it will, by natural process. If cracks occur, they will be jagged and zig-zag the opposite faces meshing with each other so as to hold them against vertical or lateral displacement, and will be filled by the bituminous concrete, so that they will not appear upon the surface nor impair the surface of the roadway.

It will be noted that the principal part of the wearing surface of the completed pavement is stone, and that the larger part of the stone surface is comprised of the upper surfaces of the upper stones of the concrete stratum. From which it will be understood that the brunt of the wear is encountered by the Portland cement concrete stratum. However, the bituminous concrete filler (which we may say is at its maximum efficiency as to resistance to wear when completed) protects these stones from abrasion, breaking, chipping, and disintegrating, and from loosening from their matrix in the cement concrete body. On the other hand, these stones serve to hold the bituminous concrete filler in place and to prevent "creeping."

The whole wearing surface is comprised of stone embedded in and forming part of the concrete stratum, bitumen, and stone embedded in the bitumen. The surface is smooth and non-slippery, and affords, in such smooth and non-slippery wearing surface, a combination of rigidity and elasticity not found in any other pavement.

It will now be understood that my pavement may be opened to traffic with safety within the time usually required, it being at its maximum resistance to wear not long after completed. If cracks occur they will be filled automatically by the bituminous concrete. The surface will wear many years before going down through the bitumen, and by that time, the Portland cement concrete will have so thoroughly hardened as to have reached nearly or approximately its maximum resistance to wear, and it will also have ceased its shrinkage.

From the foregoing it will be understood that mine is essentially a concrete pavement,—not an asphalt or other bituminous pavement with concrete foundation,—and that the bituminous concrete filler is used to initially conserve the Portland cement concrete body and especially the wearing surface thereof; and further it will be noted that while I use the bituminous concrete filler to conserve the Portland cement concrete body, the latter also conserves the former; and the whole produces a wearing surface that is smooth and non-slippery, elastic and rigid; a combination not found in any known pavement.

As hereinbefore intimated, I am aware of pavements with Portland cement concrete foundations and superposed wearing surfaces of bituminous and other material; and it should be understood that I do not claim the same or any superposed wearing surface or method of making same.

What I do claim is:

1. A cement concrete pavement comprising a sub-base formed of loose crushed rock of small maximum size and down with the dust included, a concrete stratum laid upon said sub-base, said stratum embodying larger sized stones of approximately uniform size and rolled hard to place the upper surfaces of the upper stones of said stratum in a common plane, which plane is the upper and exposed surface of the finished pavement, a filler for the voids between the stones in said stratum, said filler being formed of Portland cement mortar, and extending up to within a short distance of said common plane surface, and bituminous concrete for filling the interstices between the stones above said filler, said concrete being composed of bitumen and small sized stones free from dust, the upper plane of said concrete being substantially co-incident with said common plane.

2. A cement concrete pavement comprising a sub-base formed of loose crushed rock of small maximum size and down with the dust included, a concrete stratum including larger sized stones of approximately uniform size laid upon the sub-base and rolled heavily to place the upper surfaces of the upper stones in a common plane corresponding to the upper exposed surface of the finished pavement, said stratum having shallow interstices between the upper portions of said stones, and bituminous concrete filling said interstices up to said common plane, whereby the initially exposed surface of the finished pavement will be formed of the upper surfaces of said stones and the network of bituminous concrete within the interstices.

3. A cement concrete pavement comprising a concrete stratum embodying relatively large-sized stones rolled hard to place the upper surfaces of the upper stones of said stratum substantially in a common plane, which plane is the upper and exposed surface of the finished pavement, a filler for the voids between the stones in said stratum, said filler being formed of Portland cement mortar or grout and extending up to within a short distance of said common plane surface, and bituminous concrete filling the interstices between the stones above said Portland cement filler, said bituminous concrete being composed of relatively small sized stones and bituminous material, the upper plane of said bituminous concrete being substantially coincident with said common plane.

In testimony whereof I have affixed my signature in presence of two witnesses.

FREDRICK H. WEBSTER.

Witnesses:
W. F. MEANS,
PRUDENCE M. READ.